United States Patent
Quak et al.

(10) Patent No.: US 6,512,647 B1
(45) Date of Patent: Jan. 28, 2003

(54) METHOD AND APPARATUS FOR ADAPTIVE TUNING BIAS CURRENT FOR MAGNETORESISTIVE HEAD

(75) Inventors: Beng Wee Quak, Singapore (SG); Bernard Tuang Liang Lim, Singapore (SG); Myint Ngwe, Singapore (SG); Song Wee Teo, Singapore (SG); Beng Theam Ko, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/550,370

(22) Filed: Apr. 14, 2000

Related U.S. Application Data
(60) Provisional application No. 60/151,208, filed on Aug. 27, 1999.

(51) Int. Cl.[7] ............................... G11B 5/03
(52) U.S. Cl. ........................... 360/66; 360/65
(58) Field of Search .................. 360/66, 55, 65, 360/67

(56) References Cited

U.S. PATENT DOCUMENTS

| | | | |
|---|---|---|---|
| 3,979,771 A | 9/1976 | Taggart, Jr. et al. ........... 360/51 |
| 4,031,475 A | 6/1977 | Arai ............................ 325/455 |
| 4,041,467 A | 8/1977 | Cota et al. .................... 364/900 |
| 4,220,922 A | 9/1980 | Ikeguchi ....................... 455/182 |
| 4,264,986 A | 4/1981 | Willis .......................... 365/124 |
| 4,299,490 A | 11/1981 | Cahill et al. .................. 356/350 |
| 4,305,115 A | 12/1981 | Armitage ...................... 361/437 |
| 4,314,289 A | 2/1982 | Haynes ......................... 360/77 |
| 4,371,894 A | 2/1983 | Camras ......................... 358/342 |
| 4,451,792 A | 5/1984 | Gay ............................. 329/145 |
| 4,464,690 A | 8/1984 | Hanecka et al. ................ 360/84 |
| 4,596,953 A | 6/1986 | Nagasaka et al. ............. 324/242 |
| 4,679,136 A | 7/1987 | Shigemasa ..................... 364/150 |
| 4,822,169 A | 4/1989 | Distl et al. ................... 356/364 |
| 4,926,077 A | 5/1990 | Gauthier et al. ............... 310/68 |
| 5,036,294 A | 7/1991 | McCaslin ...................... 331/1 A |
| 5,052,786 A | 10/1991 | Schulz ......................... 359/484 |
| 5,185,736 A | 2/1993 | Tyrrell et al. ................ 370/55 |
| 5,235,640 A | 8/1993 | Devries et al. ................ 380/13 |
| 5,287,744 A | 2/1994 | Norling et al. ................ 73/497 |
| 5,299,075 A | 3/1994 | Hanks ......................... 360/77.02 |
| 5,301,080 A | 4/1994 | Ottesen et al. ................ 360/113 |
| 5,369,345 A | 11/1994 | Phan et al. ................... 318/561 |
| 5,394,322 A | 2/1995 | Hansen ......................... 364/148 |
| 5,442,618 A | 8/1995 | Dewey et al. ................. 369/124 |
| 5,455,717 A | 10/1995 | Van Doorn et al. ............ 360/6 |
| 5,479,168 A | 12/1995 | Johnson et al. ............... 341/110 |
| 5,682,076 A | 10/1997 | Zumeris ........................ 310/323 |
| 5,719,716 A * | 2/1998 | Suzuki ........................ 360/25 |
| 5,790,334 A * | 8/1998 | Cunningham ................... 360/66 |
| 5,917,680 A | 6/1999 | Valstyn et al. ................ 360/113 |
| 5,986,839 A | 11/1999 | Klaassen et al. ............... 360/66 |
| 6,115,201 A * | 9/2000 | Enarson et al. ................ 360/66 |
| 6,195,219 B1 * | 2/2001 | Smith .......................... 360/53 |

* cited by examiner

*Primary Examiner*—David Hudspeth
*Assistant Examiner*—Varsha A. Kapadia
(74) *Attorney, Agent, or Firm*—Westman, Champlin & Kelly, P.A.

(57) ABSTRACT

A bias current for a magnetoresistive read head is selected by defining a tuning range based on a maximum and a minimum bias current value for the head. A plurality of read operations are iteratively performed using a different bias current value over the tuning range for each iteration. The results of each read iteration are measured and a bias current is selected on the basis of the read error rates, and particularly those bias currents associated with the lowest read error rate.

13 Claims, 5 Drawing Sheets

METHOD AND APPARATUS FOR ADAPTIVE TUNING BIAS CURRENT FOR MAGNETORESISTIVE HEAD

CROSS-REFERENCE TO CO-PENDING APPLICATION

This application claims benefit of Provisional Application No. 60/151,208 filed Aug. 27, 1999 for "Temperature Compensated MR Head Bias Current Tuning".

FIELD OF THE INVENTION

This invention relates to adaptive bias currents for magnetoresitive (MR) read heads and particularly to selecting a bias current for an MR head based on read error rates.

BACKGROUND OF THE INVENTION

Magnetoresistive (MR) heads are employed in magnetic disc drives to read data from the storage disc. More particularly, the MR head employs an MR element whose resistance changes with changes in the confronting magnetic field. As the disc rotates adjacent the read head, changing magnetic fields due to recorded data on the disc moving past the MR element induces changes in the resistance of the MR element. A fixed bias current is applied to the head to generate a voltage across the head representative of the data. The voltage changes with the resistance changes to provide signals representing the data.

There is a continuing need to increase the recording capacity, and hence the density of data recording, on discs. Consistent with this need, efforts have been directed to more narrow data tracks and smaller track spacing. As track widths become more narrow and track spacing becomes smaller, the read heads also become more narrow, so as not to extend over the space between the tracks that might cause errors due to simultaneous reading of two or more data tracks.

As the dimensions of the MR heads become smaller, it becomes more difficult to control the dimensional variations to a reasonable tolerance. Consequently, smaller MR heads are subject to large relative dimensional variations, resulting in wide variations of the resistance of the heads. As a result, for a given bias current, different heads of the same disc drive might exhibit large differences in resistance ranges, resulting in a wide range of power dissipation between the heads. Thus, the bias current must be increased for heads whose MR elements have low resistance in order to achieve a design output voltage. Conversely, if the MR element has a high resistance, the bias current must be reduced so that the head does not overheat due to increased power dissipation. Overheating the head leads to head failure.

It has been the practice to match MR heads for a given disc drive so that the same bias current level is applied to all of the heads in the drive. Thus, the head characteristics are measured and the heads are matched with other like heads for the disc drive. However, while head matching solves the problem of bias current levels at the time of manufacture, different head react to environmental conditions differently, so that a condition, such as temperature, that might alter the resistive characteristics of the heads may affect different heads of the same disc drive differently, resulting in head failure.

The present invention is directed to an adaptive bias current system whereby the bias current for a given MR head is adaptively selected for optimal performance of the head. Where plural recording surfaces, and hence plural read heads, are employed within the disc drive, the bias current for each MR head is optimally tailored to the head. Hence, the present invention is directed to adaptively tuning the bias current to the MR heads to address manufacturing variances and fluctuations in magnetoresistive properties of the head due to environmental conditions, such as temperature fluctuations.

The present invention addresses these and other problems, and offers other advantages over the prior art.

SUMMARY OF THE INVENTION

Broadly, the present invention provides a method of selecting a bias current for a magnetoresistive read head for a disc drive. A maximum and a minimum bias current value for the head are identified, from which a range of bias current values is derived. A plurality of read operations are iteratively performed using a different bias current value for each iteration over the range. A read error rate is measured for the result of each read iteration. The bias current is selected based on the read error rates.

In a preferred form of the invention, the bias current value is incrementally stepped over the range, and the bias current is selected based on the lowest read error rate. Where a single bias current value is associated with the lowest read error rate, the selected bias current has that bias current value. Where a plurality of bias current values are associated with the lowest read error rate, the selected bias current has a value between the highest and lowest bias current values associated with the lowest read error rate.

In one form of the invention, where a plurality of bias current values are associated with the lowest read error rate, the number of incremental bias current values in the range defined by the highest and lowest bias current values associated with the lowest read error rate is identified. If the number is odd, the bias current whose value equals the bias current value centered between highest and lowest bias current values of the range is selected. If the number is even, the bias current whose value equals the bias current value centered between (a) either the highest or lowest bias current value and (b) a bias current value incrementally adjacent the other of the highest and lowest bias current values.

In one embodiment of the invention, the maximum bias current value is identified by identifying a predetermined maximum power for the head. The bias current to the head is then varied to identify a bias current that generates a voltage across the head that exceeds a predetermined threshold voltage. The maximum bias current value is then calculated based on the predetermined maximum power, the identified bias current and the predetermined threshold voltage.

In another embodiment of the invention, the maximum bias current value is identified by identifying a predetermined maximum power for the head. A voltage across the head to a read amplifier is varied from high to low until the voltage triggers operation of the amplifier. The bias current at which the voltage across the head triggers operation of the amplifier is identified, and the maximum bias current is calculated based on the predetermined maximum power, the identified bias current and the voltage triggering operation of the amplifier.

In a preferred form of the invention, the minimum bias current value is identified by varying a bias current to the head from high to low, monitoring an ability of a read amplifier receiving a voltage across the head generated by the bias current to sustain operation of a synchronization clock, and identifying the value of the bias current when the read amplifier becomes unable to sustain operation of the clock.

DETAILED DESCRIPTION OF ILLUSTRATIVE EMBODIMENTS

Figure 1:
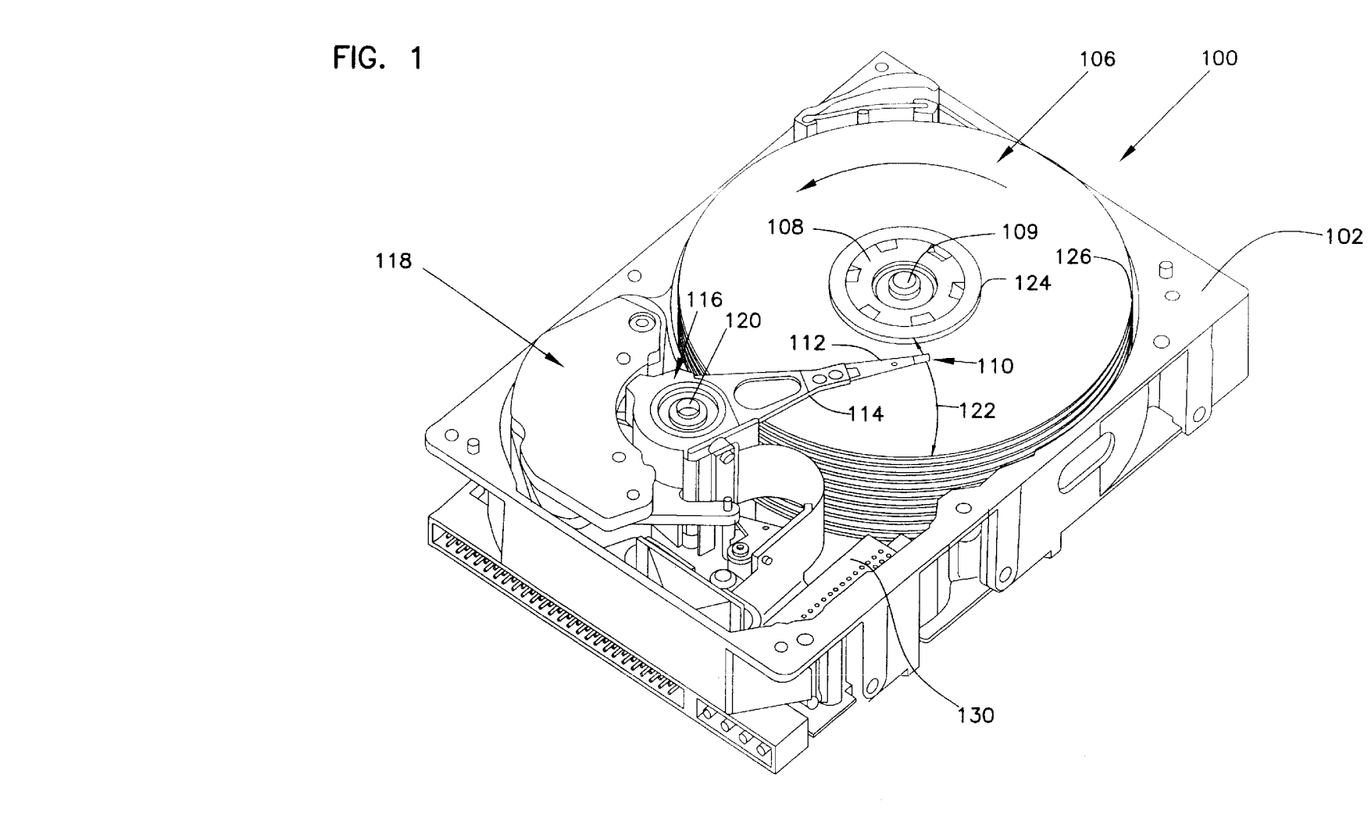
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head-slider 110, which is mounted to disc drive 100 for communication with the disc surface. In the example shown in FIG. 1, head-sliders 110 include sliders supported by suspensions 112 which are in turn attached to track accessing arms 114 of an actuator 116. Actuator 116 is driven by a voice coil motor (VCM) shown generally at 118. Voice coil motor 118 rotates actuator 116 with its attached head-sliders 110 about a pivot shaft 120 to position the heads supported by head-sliders 110 over a desired information track along an arcuate path 122 between a disc inner diameter 124 and a disc outer diameter 126. Voice coil motor 118 is driven by servo electronics supplied by circuit board 130 based on signals generated by one or more heads 110 and a host computer (not shown). The heads of head-sliders 110 include a magnetoresistive (MR) read head having an MR element operated by a bias current from circuit board 130. The bias current operates with the resistance of each head to provide a voltage signal to circuit 130 representative of data recorded on the respective disc 106.

Figure 2:
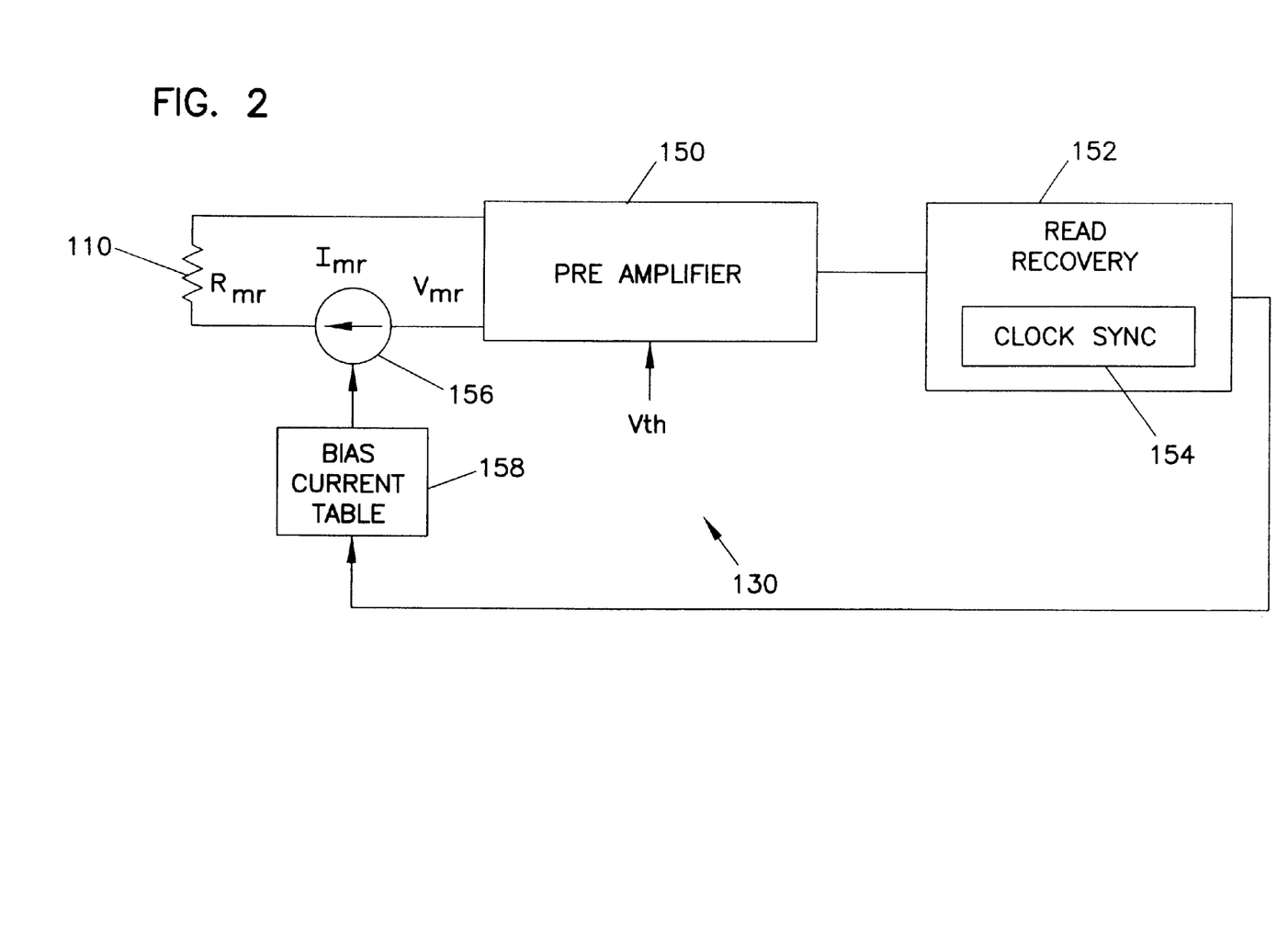
FIG. 2 is a block diagram illustrating a portion of the bias current generator and read recovery circuits of a disc drive illustrated in FIG. 1.

The present invention is directed to adaptively tuning the bias current to MR head 110. As illustrated in FIG. 2, circuit board 130 includes preamplifier 150 connected to receive the voltage across MR head 110. Preamplifier 150 is connected to a read recovery circuit 152 for the disc drive. Read recovery circuit 152 is ordinarily part of the read channel, but may included in circuit board 130 in the disc drive. Read recovery circuit includes a clock recovery circuit 154 that locks onto the data rate to synchronize the clock to the data. Current source 156 supplies bias current to MR heads 110. Table 158 contains codes associated with incremental values of bias current and provides one or more selected codes to source 156 so that source 156 supplies a selected bias current value to each MR head 110.

Preamplifier 150 is responsive to voltage signals from MR head 110 to amplify those signals and provide them to the read recovery circuit. When the product of the head resistance, Rmr, and the bias current, Imr, exceeds a predetermined threshold, Vth, associated with the preamplifier, preamplifier 150 will trigger and provide a measurable output signal to read recovery circuit 152. However, if the product of Rmr and Imr does not exceed the threshold voltage Vth, the preamplifier will not trigger, and no output to read recovery circuit 152 occurs.

The present invention employs a look-up table 158 that contains codes associated with different incremental values of bias current for the MR head. Typically, table 158 is used with read retry algorithms that incrementally step the bias current in the event of a read failure. The present invention is directed to selecting a bias current for each MR head on the basis of a maximum and minimum bias current value for the head and selecting an incremental bias current value based on read error rates associated with bias current values over the range.

The first step in the process is the determination of the resistance for the head. Maximum head resistance is predicted on the basis of experimental data by measuring the resistance at one or more selected temperatures within the operating parameters of the MR head. The resistance-temperature gradient of an MR head is substantially linear within the operating range of the head, with the resistance varying between a low value at a low temperature and a high value at a higher temperature. One commercially available MR read head exhibits a resistance of 70.09 ohms at 0° C. and a resistance of 80.24 ohms at 70° C., both in the absence of a magnetic field. Hence, that head has a resistance-temperature gradient of 0.145 $\Omega/C°$.

The head resistance Rmr is measured by either of two techniques, one involving varying the bias current Imr to trigger preamplifier 150 and the other involving varying the threshold voltage Vth to trigger preamplifier 150. The head resistance Rmr at a given temperature equals Vth/Imr. According to the first technique, the bias current provided by source 156 is increased to the head until the voltage, Vmr, at the input to preamplifer 150 exceeds the threshold voltage; that is, Rmr·Imr>Vth. The head resistance Rmr may be calculated from the measured bias current, Imr, where Vmr exceeds Vth: Rmr=Vth/Imr. According to the second technique, Imr is set to a predetermined value and the threshold voltage is lowered until the threshold voltage Vth is smaller than the voltage, Vmr, at the input to preamplifier 150, and the preamplifier triggers. The value of Rmr may be calculated.

The maximum current Imax is then derived from a preselected maximum power Pmax $$Imax=(Pmax/Rmr)^{1/2}$$

The result is then compared against table 158 to identify the incremental Imr in table 158 to select a maximum bias current for the head to be provided by source 156. As will become apparent hereinafter, the maximum bias current is an incremental bias current established by table 158 that is below the calculated Imax.

The minimum bias current, Imin, is the minimum bias current necessary to produce a voltage to sustain operation of clock recovery circuit 154. More particularly, the voltage, Vmr, input to preamplifier 150, is amplified and supplied to read recovery circuit 152 which is part of the read channel of the disc drive. That voltage is employed by clock recovery circuit 154 to synchronize the read clock to the data. The minimum bias current value, Imin, is the smallest incremental bias current selected from table 158 necessary to operate clock recovery circuit 154 to synchronization.

Figure 3:
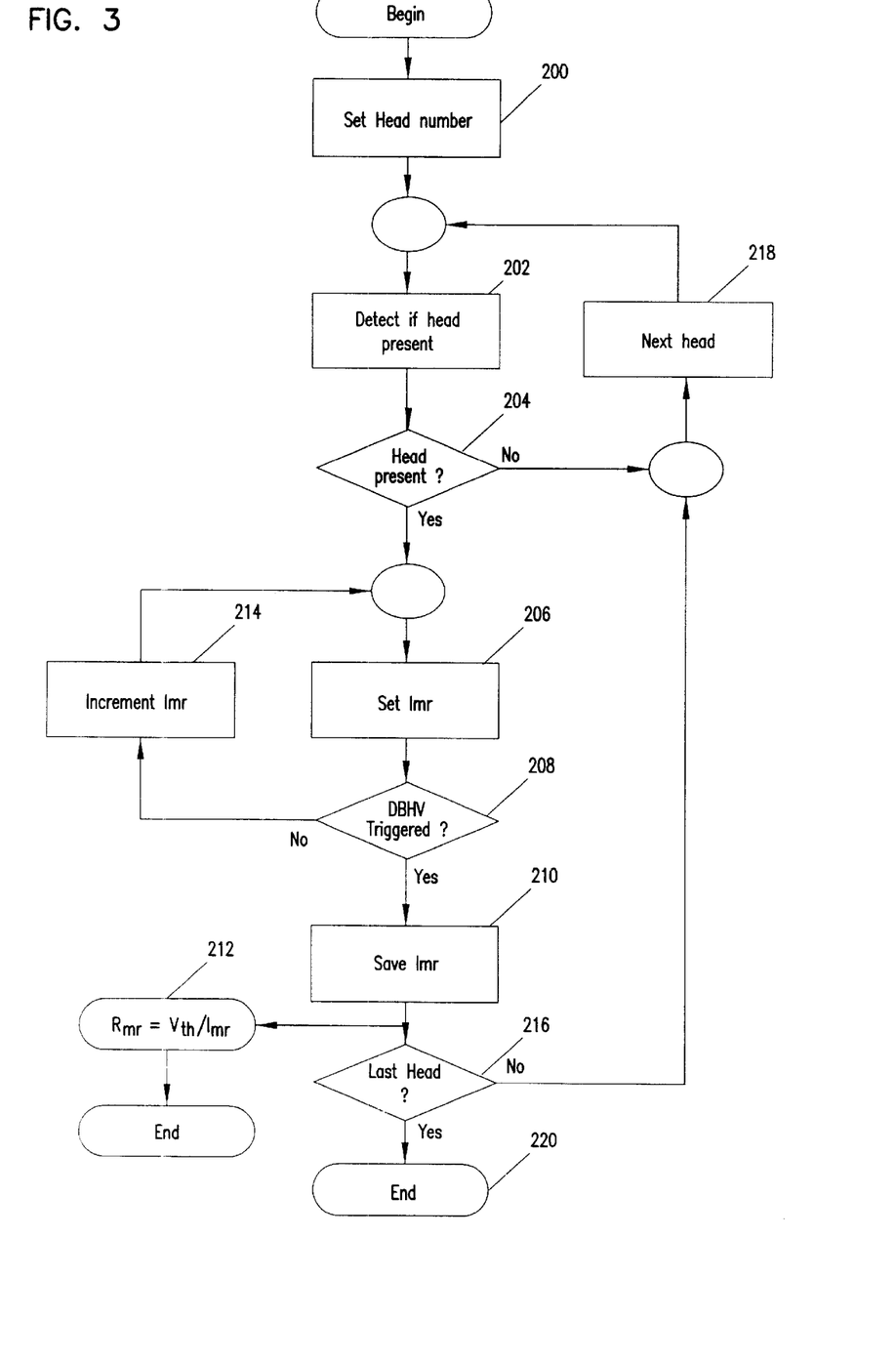
FIG. 3 is a flow chart illustrating the process of determining head resistance of a magnetoresistive (MR) head according to one embodiment of the present invention.

FIG. 3 is a flow diagram illustrating the process steps of one of the processes to identify head resistance. It is well known that a read head is provided for each disc surface in disc drive 100 (FIG. 1). Hence, if disc pack 106 has six discs, the disc drive has twelve disc surfaces and at least twelve read heads 110. The process of identifying head resistance for the heads of the disc drive begins by the controller on circuit 130 selecting, at step 200, a head whose resistance is to be measured. Thus, at step 200, one of the twelve heads is selected. At step 202, the controller conducts a test to determine whether the selected head is present. If, at step 204, the controller determines that the selected head is present, the controller selects a minimum bias current Imin for the bias current, Imr, at step 206. At step 208, preamplifier 150 determines if the bias current is adequate to trigger the preamplifer. If preamplifier 150 is triggered, the value of the bias current Imr is saved from table 158 at step 210 and the head resistance Rmr is determined at step 212. Typically, the triggering of preamplifier 150 is determined by testing the voltage at a digital buffer head voltage (DBHV) pin of the preamplifier.

If, at step 208, the preamplifier is not triggered, the bias current from source 156 is incremented by table 158 at step 214 to the next higher incremental current, and the process loops back to steps 206 and 208. Hence, the bias current Imr is incrementally advanced by table 158 at step 214 in the loop formed by steps 206, 208 and 214 until the preamplifier is triggered and the value of the bias current, Imr, at triggering is saved at step 210. The head resistance value, Rmr, is calculated by the controller at step 212 on the basis of the threshold voltage of the preamplifier and the saved bias current. The saved resistance value is the resistance of the head at the temperature at which the tests were conducted.

After the bias current and head resistance values for the selected head are saved, the controller determines, at step 216, whether the head is the last head of the disc drive. If it is not, the process loops back and increments to the next head at step 218, with the process repeating for the next head to save the bias current and head resistance values for the next head. On the other hand, if a determination is made at step 218 that the last head has been tested, the process ends at step 220. As illustrated in FIG. 3, step 204 determines the presence or absence of the head under test. If, for some reason, the head is not present in the disc drive, the process loops through step 218 to the next head and continues as described.

Based on the head resistance, Rmr, calculated at step 218 for each head, a maximum bias current, Imax, may be determined. The calculated maximum bias current value is compared against the incremental values in table 158 (FIG. 2) to select the highest bias current value in the table that does not exceed the maximum bias current value.

That selected bias current value is applied to current source 156 to apply the bias current, Imr, to the head having the selected value. Under certain circumstances, it may be desirable to reduce the selected bias current by one or more additional increments from the selected maximum bias current. The head resistance and maximum bias current values are stored in a buffer in the disc drive controller for use in the process illustrated in FIGS. 4 and 5.

After the maximum and minimum bias current values (Imax and Imin) are selected, the tuning range is established with the maximum bias current value being the upper limit of the tuning range and the minimum bias current value being the lower limit of the range. Each incremental bias current Imr within the tuning range is applied to the read head to perform a read operation with read recovery circuit 152 from the confronting disc 106 (FIG. 1). For each read operation, an error rate is determined by circuit 152 based on the well-known root means square method. The read operations are performed through the entire tuning range to derive a set of root means square error counts. Typically, these results incrementally vary as an inverse bell-shaped curve.

The controller identifies and selects that incremental bias current value, Imr, from table 158 that is associated the lowest error rate as the default bias current value for the head. Optionally, the controller may filter the results to smooth the curve.

Where two or more incremental bias current values are associated with the lowest error rate, the controller selects the default bias current at a midpoint between the lowest and highest incremental bias currents having the lowest error rates. Hence, the highest and lowest bias current values having the lowest error rates define a range of acceptable incremental bias current values from which a midpoint incremental value is selected. The range of acceptable bias current values is, of course, within the range defined by Imax and Imin. If the number of increments in the acceptable range is an odd number, that incremental bias current value at the center of the acceptable range is selected as the default bias current value. If the number of increments in the acceptable range is an even number, then the error rates associated with the incremental current values immediately adjacent Imax and Imin and outside the acceptable range are taken into consideration in selecting the default incremental bias current value.

More particularly, where the acceptable range contains an even number of increments, the error rates associated with the bias currents just outside the acceptable range are examined to identify that one bias current value (as between the two bias current values adjacent and outside the acceptable range) associated with the lowest error rate. That one bias current value is then added to the acceptable range as the new upper or lower limit and the incremental bias current value at the center of the new acceptable range is selected as the default bias current value. Assume, for example, a range defined by Imax and Imin containing sixty-four incremental bias current values, with increments 23 and 26 being the lowest and highest bias current values associated with the lowest error rates defining the range of acceptable bias current values. Since the number of increments within the acceptable range is even, the error rates associated with the bias currents immediately outside the range (increments 22 and 27, in the example) are considered. If the read error rate associated with incremental bias current value 22 is lower than the read error rate associated with incremental bias current value 27, the bias current value of increment 22 is substituted for the bias current value of increment 23 as the lower limit of the acceptable range, and the bias current value of increment 24 is selected as the default bias current. Conversely, if the read error rate associated with incremental bias current value 27 is lower than that of incremental bias current value 22, the range of acceptable bias currents is redefined as between increments 23 and 27 and the center incremental bias current value 25 is selected as the default bias current value.

Figure 4:
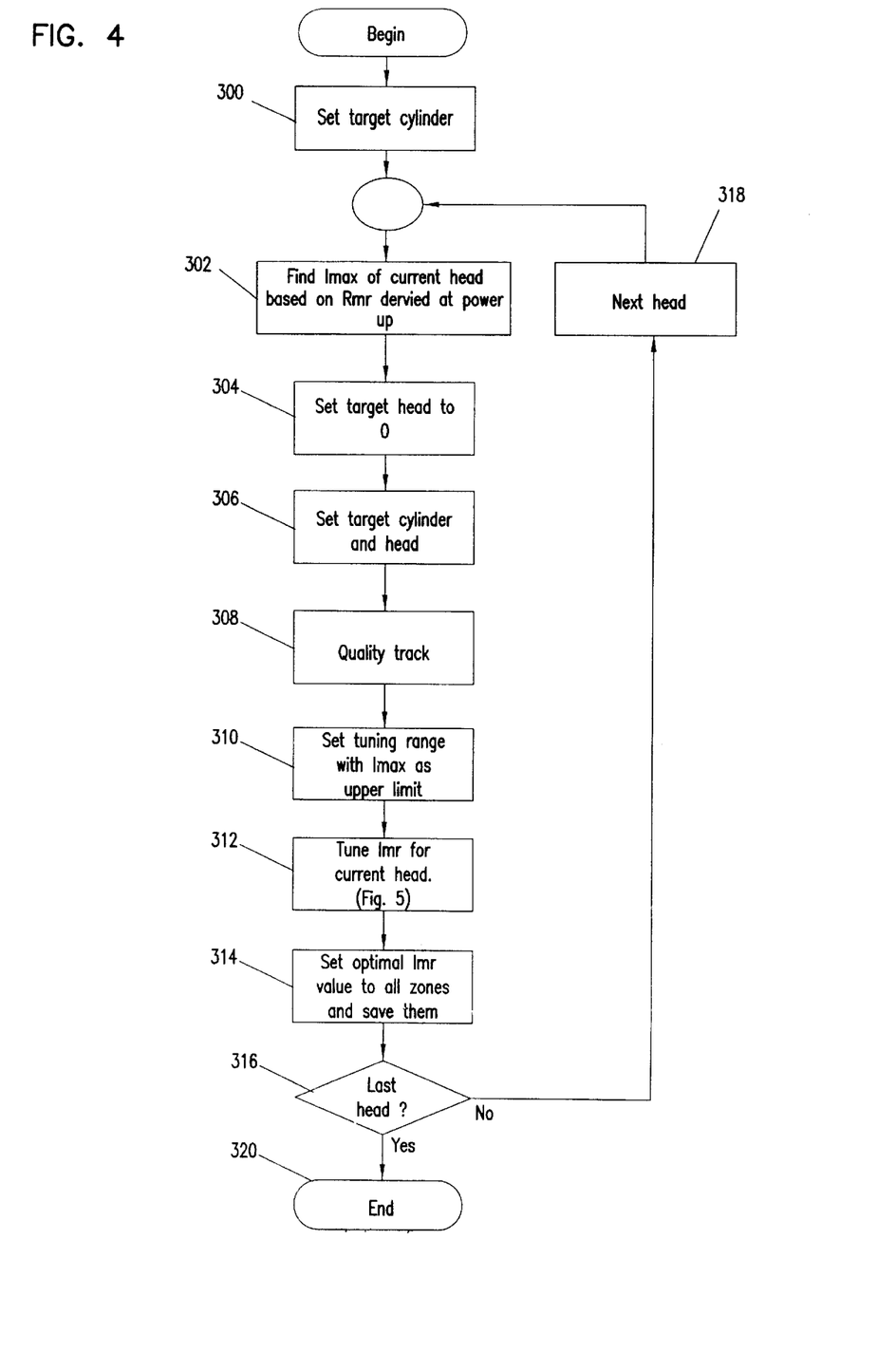
FIGS. 4 and 5 are flow charts illustrating the process of adaptively tuning the bias current for an MR head according to the present invention.
Figure 5:
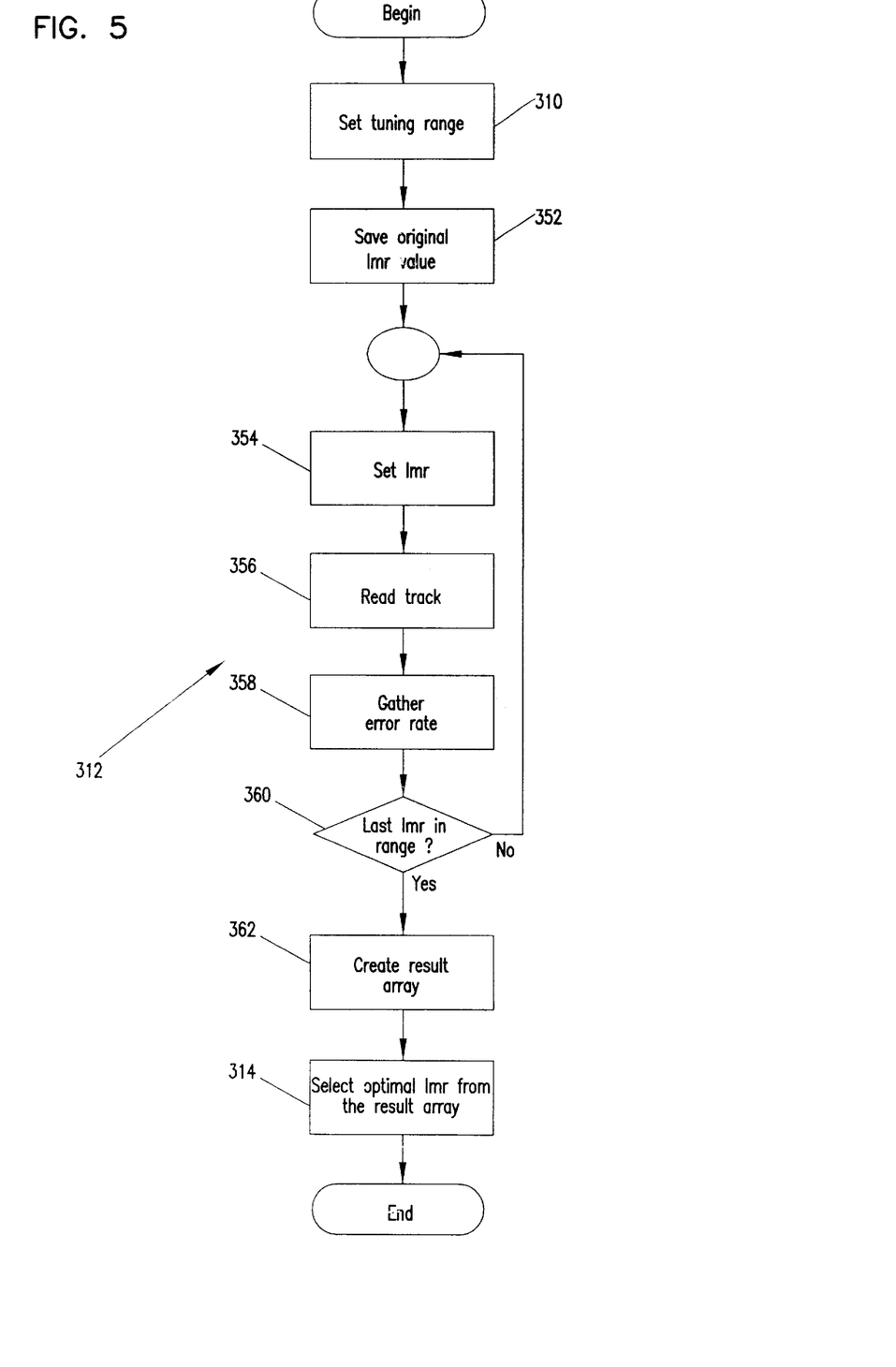

FIGS. 4 and 5 are flow charts illustrating the steps employed in adaptively tuning the bias current for an MR head according to the present invention. In a preferred form of the invention, this process is performed by disc drive firmware when the disc drive is powered up by the user. Initially, a target cylinder is selected with which the tests will be performed (step 300). As is well known, a cylinder is defined by the plurality of tracks, one on each disc surface, confronting a head at a given position of the actuator arm. A maximum bias current value, Imax, and a minimum bias current value, Imin, are identified as described above (step 302). In a preferred form of the invention, the value of Imin is established at manufacture for all of the heads of the disc drive and is stored in the disc drive table. The value of Imax is preferably calculated for each head each time the disc drive is powered up. A head 110 is selected for testing (step 304). Typically, the heads are numbered and the process begins with the first head, head 0. Where the disc drive contains plural discs (for example six discs), the heads will be numbered in some sequence for testing (such as 0–11 for the twelve heads in a six-disc drive). Voice coil 118 is operated to move the selected head to the target cylinder (step 306) and the track is qualified (step 308). The tuning range is defined (step 310) by the maximum and minimum bias currents, Imax and Imin. The bias current value, Imr, is then selected for the head under test (step 312) and saved (step 314). Step 312 is set forth in greater detail in FIG. 5. At step 316 the process determines whether the head just tested is the last head of the drive. If it is not, the process loops back to step 302, incrementing the head number at step 318, and the process is repeated for the next head until the optimal bias current values are selected for all the heads of the disc drive and the process ends at step 320.

To optimize recording density on a disc 106, many disc drives employ zone bit recording by which the disc is mapped into a plurality of concentric zones and information is recorded at a different frequency in each zone. The optimal bias current value is selected for each head and applied to all zones. An optional variation of the process described in FIG. 4 separately tunes the bias current to different values for each zone. This may be accomplished by simply looping the process back to step 300 to set a new target cylinder in another zone. This loop back may occur after step 314 to test the head currently under test in the new cylinder, or may occur after step 316 so that all the heads are tested in each zone sequentially. In any case, the optimal bias current value is set for all zones.

FIG. 5 illustrates step 312 in greater detail. After the tuning range established by Imax and Imin has been established at step 310, the previous bias current value for the head or head/zone is saved at step 352. The prior bias current value is saved in case the tuning process is aborted and return to the prior bias current value is required. It may also be useful to save the bias current value history for maintenance and diagnosis purposes. At step 354, the bias current is set to a predetermined value, such as Imin. Using the test bias current established in step 354, the test data that are prerecorded on the track are read (step 356) and an error rate is measured (step 358) based on the success of the read operation. A determination is made (step 360) whether the test just completed used the last incremental bias current value in the tuning range (e.g., Imax). If the test did not use last incremental bias current value, the process loops back to step 354 where the bias current is incremented to the next incremental value. The process is repeated through the entire tuning range between Imin and Imax. After the incremental bias currents have been tested with the head, a result array is created at step 362 providing the error rates for each incremental bias current value over the tuning range. As described above, if plotted, the array is in the form of an inverse bell curve. Next, the optimal bias current value is selected from the array at step 314, as previously described. More particularly, the bias current value(s) having the lowest error rate are identified, and if more than one bias current value is associated with the lowest error rate, the bias current value midpoint between the highest and lowest bias current values having the lowest error rate is selected. If the number of incremental bias current values in the acceptable range is an even number, the range is adjusted so that the number of bias current values in the acceptable range is an odd number, as previously described. The selected bias current is the center incremental bias current value of the acceptable range.

The present invention thus provides a method of selecting a bias current for a magnetoresistive read head 110 for a disc drive 100, in which a maximum bias current value, Imax, and a minimum bias current value, Imin, for the head for the head are identified to define a range of bias current values. A plurality of read operations 356 are iteratively performed using a different bias current value over the range for each iteration. A read error rate is measured 358 for each bias current value, and a bias current is selected based on the read error rates. Conveniently, the read operations are performed by applying incrementally stepped bias current values to the head. The optimal bias current value is selected by identifying the bias current value of each bias current value associated with the lowest read error rate, and selecting the bias current based on the identified bias current values. If more than one bias current value is associated with the lowest error rate, the bias current is selected from an acceptable range of values between the highest and lowest bias current values associated with the lowest read error rate. More particularly, if the acceptable range of values contains an odd number of incremental bias current values, the selected bias current is equal to the bias current value centered in the acceptable range. If the acceptable range is contains an even number of incremental values, the range is adjusted to include one additional increment from outside the range and the selected bias current is equal to the bias current value of the adjusted acceptable range.

The maximum bias current, Imax, is identified using a predetermined maximum power for the head. In one embodiment, the bias current to the head is varied to identify the incremental bias current value that generates a voltage across the head exceeding a predetermined threshold voltage. In another embodiment, a fixed bias current is applied to the head to generate a read voltage to a read amplifier 150, and the threshold voltage is adjusted from high to low until the read voltage exceeds the threshold and triggers operation of the amplifier. In both embodiments, the maximum bias current value is calculated from the predetermined maximum power, the bias current and the threshold voltage.

In one form of the invention, the minimum bias current, Imin, is identified by varying a bias current to the head from high to low, and monitoring the read recovery circuit 152 to determine when the clock recovery circuit 154 is unable to synchronize the data clock signal.

Although the present invention has been described with reference to adaptively tuning the bias current for an MR head in a magnetic disc drive, those skilled in the art will recognize that the present invention may be practiced in other environments where a bias current to an MR element may be adaptively tuned. Moreover, while the invention has been described in association with a disc drive having a plurality of disc surfaces and a like plurality of heads, the invention may be practiced where only a single MR element is used.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the maximum and minimum bias current values may be determined by any of a variety of techniques, or may be preset for one or more of the heads of the unit, and can be determined sequentially with the same circuitry or by parallel circuitry depending on the particular application without departing from the scope and spirit of the present invention. The process may be performed at startup of the disc drive, or periodically during operation of the drive. Other modifications can also be made without departing from the scope and spirit of the present invention.

What is claimed is:

1. A method of selecting a bias current for a magnetoresistive read head for a disc drive, comprising steps of:
   (a) identifying a maximum bias current value for the head;
   (b) identifying a minimum bias current value for the head;
   (c) defining a tuning range of bias current values based on the maximum and minimum bias current values;
   (d) iteratively performing a plurality of read operations with the head using a different bias current value for each iteration, the bias current values extending over the tuning range, each iteration producing a result;
   (e) measuring a read error rate associated with bias current values over the tuning range based on the respective result produced during the respective iteration;
   (f) identifying the bias current value of each bias current value associated with the lowest read error rate;
   (g) identifying whether more than one bias current value is associated with the lowest read error rate; and
   (h) if only one bias current value is associated with the lowest read error rate, selecting the bias current whose value equals the one bias current value, or
   (i) if more than one bias current value is associated with the lowest read error rate,
      (i) defining an acceptable range based on the highest and lowest bias current values having the lowest read error rate, and
      (ii) selecting a bias current value in the acceptable range.

2. The method of claim 1, wherein step (d) is performed by
   (j) incrementally stepping the bias current value over the tuning range, and
   (k) for each step of the bias current value, applying the bias current to the head.

3. The method of claim 1, wherein step (i)(i) is performed by
   (l) identifying an integer number of incremental bias current values in the acceptable range, and
   (m) establishing a size of the acceptable range to an odd number of bias current values, and step (i)(ii) is performed by
   (n) selecting a bias current whose value equals the bias current value centered in the adjusted acceptable range.

4. The method of claim 2, wherein step (m) is performed by
   (o) identifying whether the number of bias current values in the acceptable range is odd or even, and if the number is even
      (i) identifying the one bias current value having the lower read error rate from the two bias current values that are adjacent the highest and lowest bias current values associated with the lowest read error rate and outside the acceptable range,
      (ii) redefining the acceptable range based on the one bias current value identified in step (o)(i) and the one of the highest and lowest bias current values having the lowest read error rate not adjacent the one bias current value.

5. The method of claim 1, wherein step (a) is performed by
   (p) identifying a predetermined maximum power for the head,
   (q) varying a bias current to the head to identify a bias current that generates a voltage across the head exceeding a predetermined threshold voltage, and
   (r) calculating the maximum bias current value based on the predetermined maximum power, the identified bias current and the predetermined threshold voltage.

6. The method of claim 5, wherein step (q) is performed by varying the bias current to the head from low to high until the voltage across the head triggers operation of a read amplifier.

7. The method of claim 1, wherein step (a) is performed by
   (s) identifying a predetermined maximum power for the head,
   (t) setting a bias current to the head to generate a voltage across the head,
   (u) varying a threshold voltage of a read amplifier from high to low until the voltage across the head triggers operation of the amplifier, and
   (v) calculating the maximum bias current based on the predetermined maximum power, the identified bias current and the threshold voltage at which the amplifier triggered.

8. The method of claim 1, wherein step (b) is performed by
   (w) varying a bias current to the head from high to low,
   (x) monitoring an ability of a read amplifier receiving a voltage across the head generated by the bias current to sustain operation of a synchronization clock, and
   (y) identifying the value of the bias current when the read amplifier becomes unable to sustain operation of the clock.

9. A method of selecting a bias current for a magnetoresistive read head for a disc drive, comprising steps of:
   (a) identifying a maximum bias current value for the head by
      (i) identifying a predetermined maximum power for the head,
      (ii) varying either a bias current to the head or a threshold voltage of a read amplifier, between a high and low, until a voltage across the head generated by a bias current triggers operation of a read amplifier, and
      (iii) calculating the maximum bias current value based on the predetermined maximum power, the bias current at which operation of the amplifier triggered and either a predetermined threshold voltage or the threshold voltage at which the amplifier triggered;
   (b) identifying a minimum bias current value for the head;
   (c) defining a tuning range of bias current values based on the maximum and minimum bias current values;
   (d) iteratively performing a plurality of read operations with the head using a different bias current value for each iteration, the bias current values extending over the tuning range, each iteration producing a result;
   (e) measuring a read error rate associated with bias current values over the tuning range based on the respective result produced during the respective iteration; and (f) selecting a bias current based on the read error rates.

10. The method of claim 9, wherein step (f) is performed by
   (g) identifying the bias current value of each bias current value associated with the lowest read error rate, and
   (h) selecting the bias current based on the identified bias current values.

11. The method of claim 10, wherein step (h) includes
   (i) identifying whether more than one bias current value is associated with the lowest read error rate, and
   (j) if only one bias current value is associated with the lowest read error rate, selecting the bias current whose value equals the one bias current value, or
   (k) if more than one bias current value is associated with the lowest read error rate,
      (i) defining an acceptable range based on the highest and lowest bias current values having the lowest read error rate, and
      (ii) selecting a bias current value in the acceptable range.

12. A method of selecting a bias current for a magnetoresistive read head for a disc drive, comprising steps of:
   (a) identifying a maximum bias current value for the head;
   (b) identifying a minimum bias current value for the head by
      (i) varying a bias current to the head from high to low,
      (ii) monitoring an ability of a read amplifier receiving a voltage across the head generated by the bias current to sustain operation of a synchronization clock, and
      (iii) identifying the value of the bias current when the read amplifier becomes unable to sustain operation of the clock;
   (c) defining a tuning range of bias current values based on the maximum and minimum bias current values;
   (d) iteratively performing a plurality of read operations with the head using a different bias current value for each iteration, the bias current values extending over the tuning range, each iteration producing a result;
   (e) measuring a read error rate associated with bias current values over the tuning range based on the respective result produced during the respective iteration; and
   (f) selecting a bias current based on the read error rates.

13. Apparatus for selecting a bias current for a magnetoresistive read head for a disc drive comprising:
   (a) a threshold circuit identifying a maximum bias current value for the head, and a minimum bias current value for the head to define a tuning range based on the maximum and minimum bias current values, the tuning range containing a plurality of bias current values;
   (b) a current generator iteratively operated by the threshold circuit to apply different bias current values selected from the tuning range to the head;
   (c) a read recovery circuit performing a read operation with the head using each applied bias current value to produce a result for each iteration of bias current value, the read recovery circuit measuring a read error rate for each read operation; and
   (d) a controller responsive to the read recovery circuit identify the bias current value of each bias current associated with a lowest of the read error rates for all of the read operations and
      if more than one bias current value is associated with the lowest read error rate, the controller identifying an acceptable range based on the highest and lowest bias current values having the lowest read error rate and selecting a bias current value within the acceptable range, and
      if only one bias current value is associated with the lowest read error rate, the controller selecting the bias current whose value equals the one bias current value,
      the controller operating the current generator to supply the selected bias current value to the head.

* * * * *